United States Patent
Baldocchi et al.

(10) Patent No.: US 11,030,001 B2
(45) Date of Patent: Jun. 8, 2021

(54) SCHEDULING REQUESTS BASED ON RESOURCE INFORMATION

(71) Applicant: International Business Machines Corporation, Armonk, NY (US)

(72) Inventors: Anthony J. Baldocchi, Glen Ellyn, IL (US); Shaorong Liu, Wilmette, IL (US); Jordan H. Williams, Chicago, IL (US); Ethan S. Wozniak, Park Ridge, IL (US); Manish Motwani, Chicago, IL (US); Ilya Volvovski, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 16/516,574

(22) Filed: Jul. 19, 2019

(65) Prior Publication Data

US 2020/0334078 A1    Oct. 22, 2020

Related U.S. Application Data

(63) Continuation of application No. 16/390,433, filed on Apr. 22, 2019.

(51) Int. Cl.
  *G06F 9/48* (2006.01)
  *G06F 9/50* (2006.01)
  *G06F 11/30* (2006.01)

(52) U.S. Cl.
  CPC ............ *G06F 9/4881* (2013.01); *G06F 9/48* (2013.01); *G06F 9/485* (2013.01); *G06F 9/4806* (2013.01);

(Continued)

(58) Field of Classification Search
  CPC .......... G06F 9/455; G06F 9/48; G06F 9/4806; G06F 9/4843; G06F 9/485; G06F 9/4881;

(Continued)

(56) References Cited

U.S. PATENT DOCUMENTS 9,430,288 B2    8/2016    Wilson et al.
9,635,103 B2    4/2017    Earl (Continued)

OTHER PUBLICATIONS

List of IBM Patents or Patent Applications Treated as Related, dated Sep. 15, 2020, 1 page.

(Continued)

*Primary Examiner* — Charles M Swift
(74) *Attorney, Agent, or Firm* — James Nock; Andrew D. Wright; Roberts Calderon Safran & Cole, P.C.

(57) ABSTRACT

A method for execution by a request scheduler includes receiving a set of requests for execution from at least one request issuer. Resource requirements are determined for each of the set of requests, and current resource availability data is determined for resources indicated in the resource requirements. Scheduling data is generated for the set of requests based on the resource requirements and the current resource availability data. A first subset of the set of requests are added to a queue in response to the scheduling data indicating the first subset of the set of requests be queued for execution. Execution of the set of requests is facilitated in accordance with the scheduling data by facilitating immediate, simultaneous execution of a second subset of the set of requests and by facilitating serial execution of the first subset of the set of requests.

20 Claims, 10 Drawing Sheets

(52) U.S. Cl.
CPC .............. *G06F 9/4843* (2013.01); *G06F 9/50* (2013.01); *G06F 9/5005* (2013.01); *G06F 9/505* (2013.01); *G06F 9/5027* (2013.01); *G06F 9/5038* (2013.01); *G06F 9/5044* (2013.01); *G06F 11/30* (2013.01); *G06F 2209/503* (2013.01)

(58) Field of Classification Search
CPC ........ G06F 9/50; G06F 9/5005; G06F 9/5027; G06F 9/5038; G06F 9/5044; G06F 9/505; G06F 2209/503; G06F 11/30
See application file for complete search history.

(56) References Cited

U.S. PATENT DOCUMENTS

| | | | |
|---|---|---|---|
| 9,755,989 B2 | 9/2017 | Chase et al. | |
| 10,110,503 B2 | 10/2018 | Certain et al. | |
| 2002/0165892 A1* | 11/2002 | Grumann | G06Q 10/10 718/100 |
| 2009/0150891 A1* | 6/2009 | Matsa | G06F 9/4881 718/103 |
| 2010/0153955 A1* | 6/2010 | Sirota | G06F 11/1451 718/102 |
| 2011/0154350 A1* | 6/2011 | Doyle | H04L 67/1008 718/104 |
| 2011/0276977 A1* | 11/2011 | van Velzen | G06F 9/5083 718/104 |
| 2012/0011518 A1* | 1/2012 | Duan | G06F 9/5061 718/104 |
| 2012/0124591 A1* | 5/2012 | Cadambi | G06F 9/505 718/103 |
| 2012/0254300 A1* | 10/2012 | Rai | H04L 67/1002 709/203 |
| 2014/0143788 A1* | 5/2014 | Kurihara | G06F 9/5044 718/104 |
| 2015/0067688 A1* | 3/2015 | Nagasawa | G06F 9/4881 718/102 |
| 2015/0100601 A1 | 4/2015 | Leggette et al. | |
| 2015/0268993 A1 | 9/2015 | Montesinos Ortego et al. | |
| 2017/0075709 A1* | 3/2017 | Feng | H04L 67/22 |
| 2018/0232259 A1* | 8/2018 | Chowdhury | G06F 9/52 |
| 2018/0336062 A1* | 11/2018 | Kolachala | G06N 5/04 |

OTHER PUBLICATIONS

"Scheduling Requests Based on Resource Information" and drawings in related U.S. Appl. No. 16/390,433, filed Apr. 22, 2019, 61 pages.

Office Action dated Aug. 12, 2020 in U.S. Appl. No. 16/390,433, 25 pages.

Final Office Action dated Dec. 14, 2020 in U.S. Appl. No. 16/390,433, 34 pages.

* cited by examiner

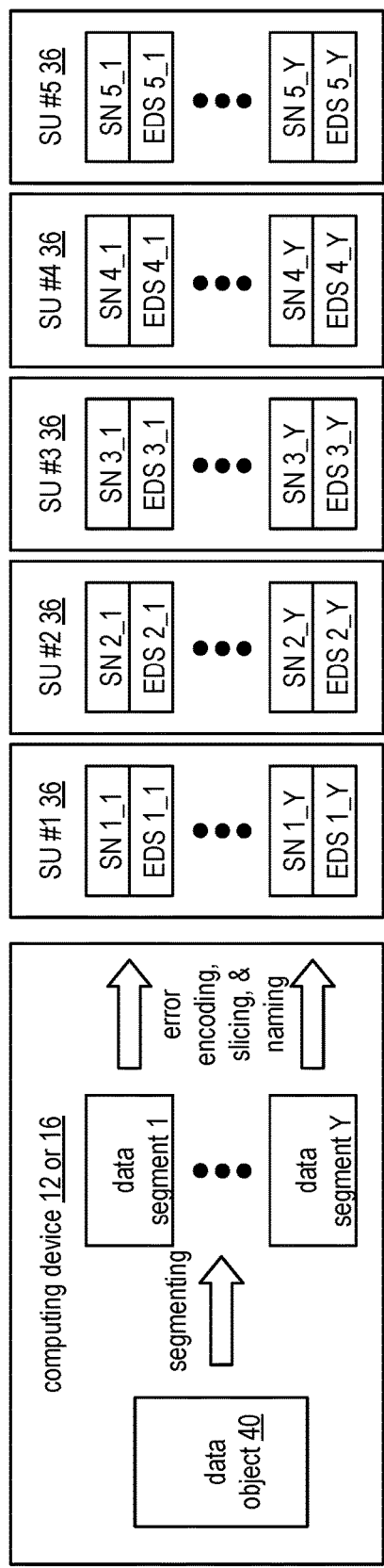
FIG. 3
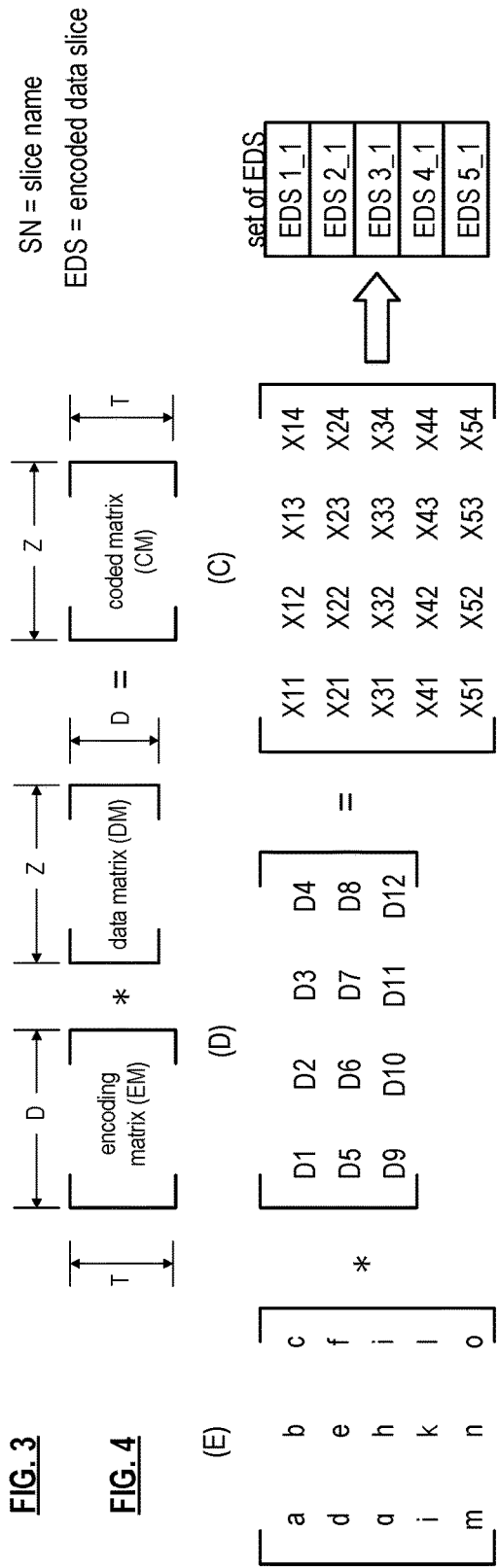
FIG. 4
FIG. 5
FIG. 6

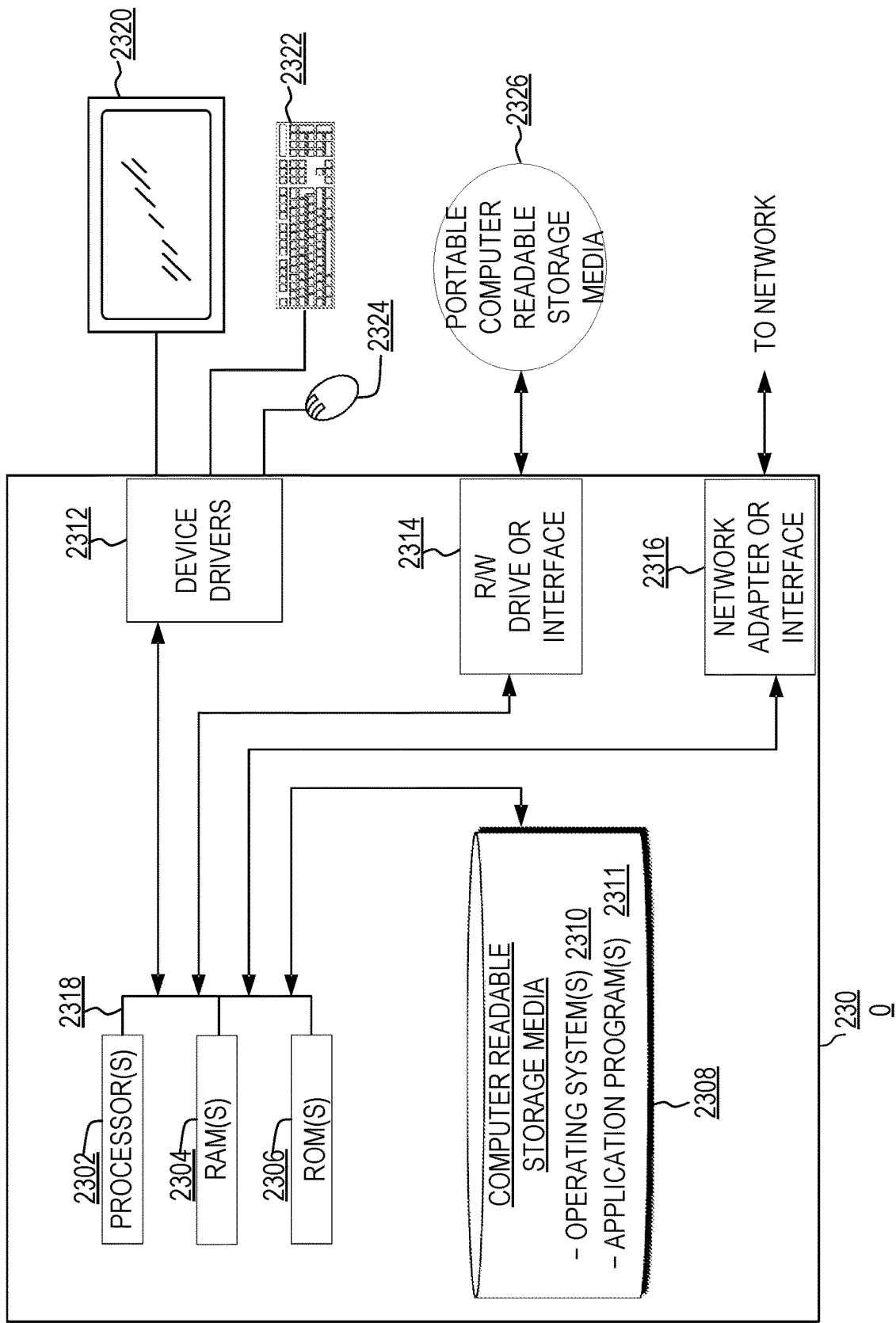

SCHEDULING REQUESTS BASED ON RESOURCE INFORMATION

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer systems.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with various embodiments of the present invention;

FIG. 4 is a schematic block diagram of a generic example of an error encoding function in accordance with various embodiments of the present invention;

FIG. 5 is a schematic block diagram of a specific example of an error encoding function in accordance with various embodiments of the present invention;

FIG. 6 is a schematic block diagram of an example of a slice name of an encoded data slice (EDS) in accordance with various embodiments of the present invention;

FIG. 13 depicts a block diagram of a computing device according to various embodiments of the present invention.

DETAILED DESCRIPTION OF THE INVENTION

Figure 1:
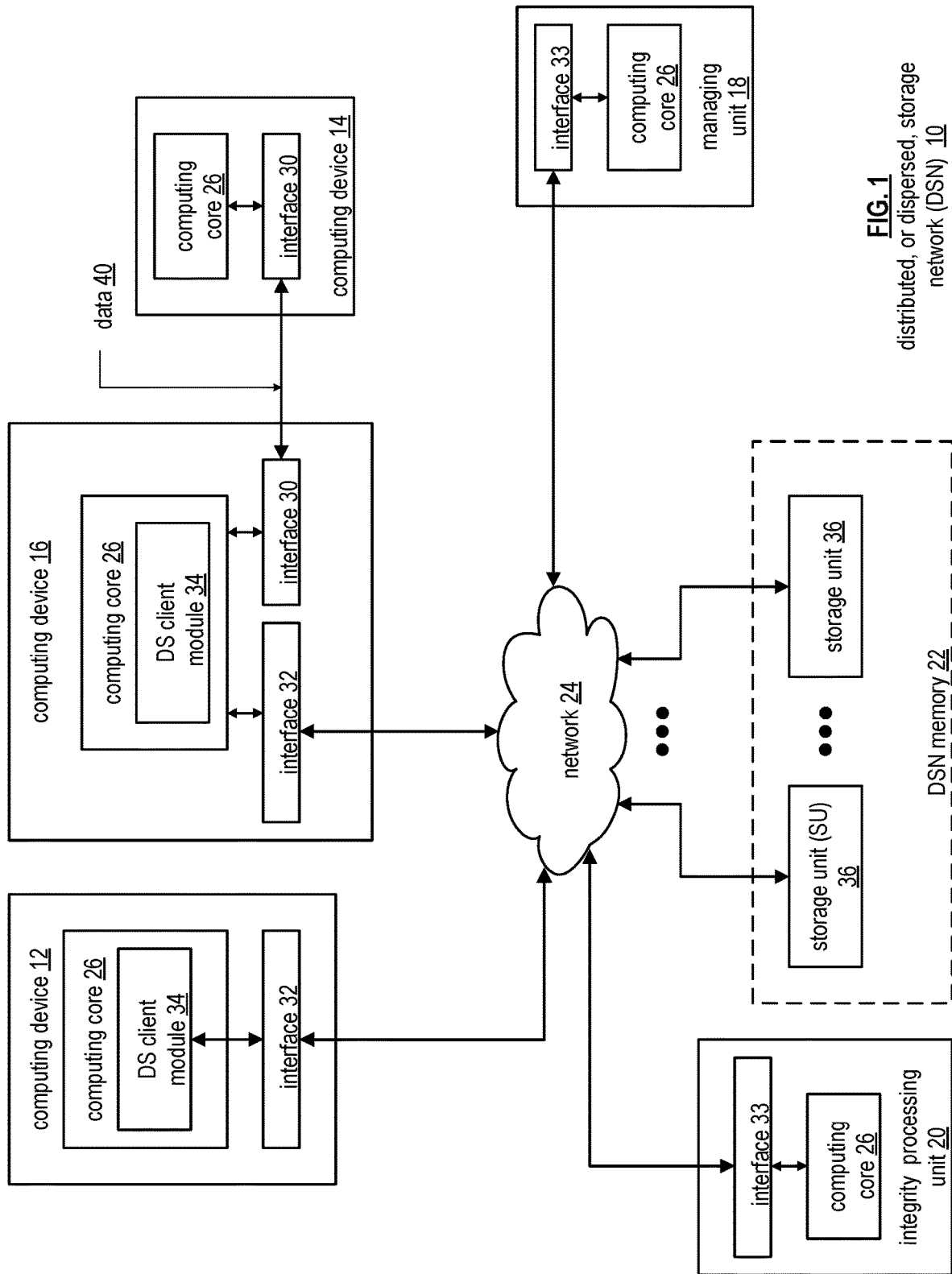
FIG. 1 is a schematic block diagram of an embodiment of a dispersed or distributed storage network (DSN) in accordance with various embodiments of the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
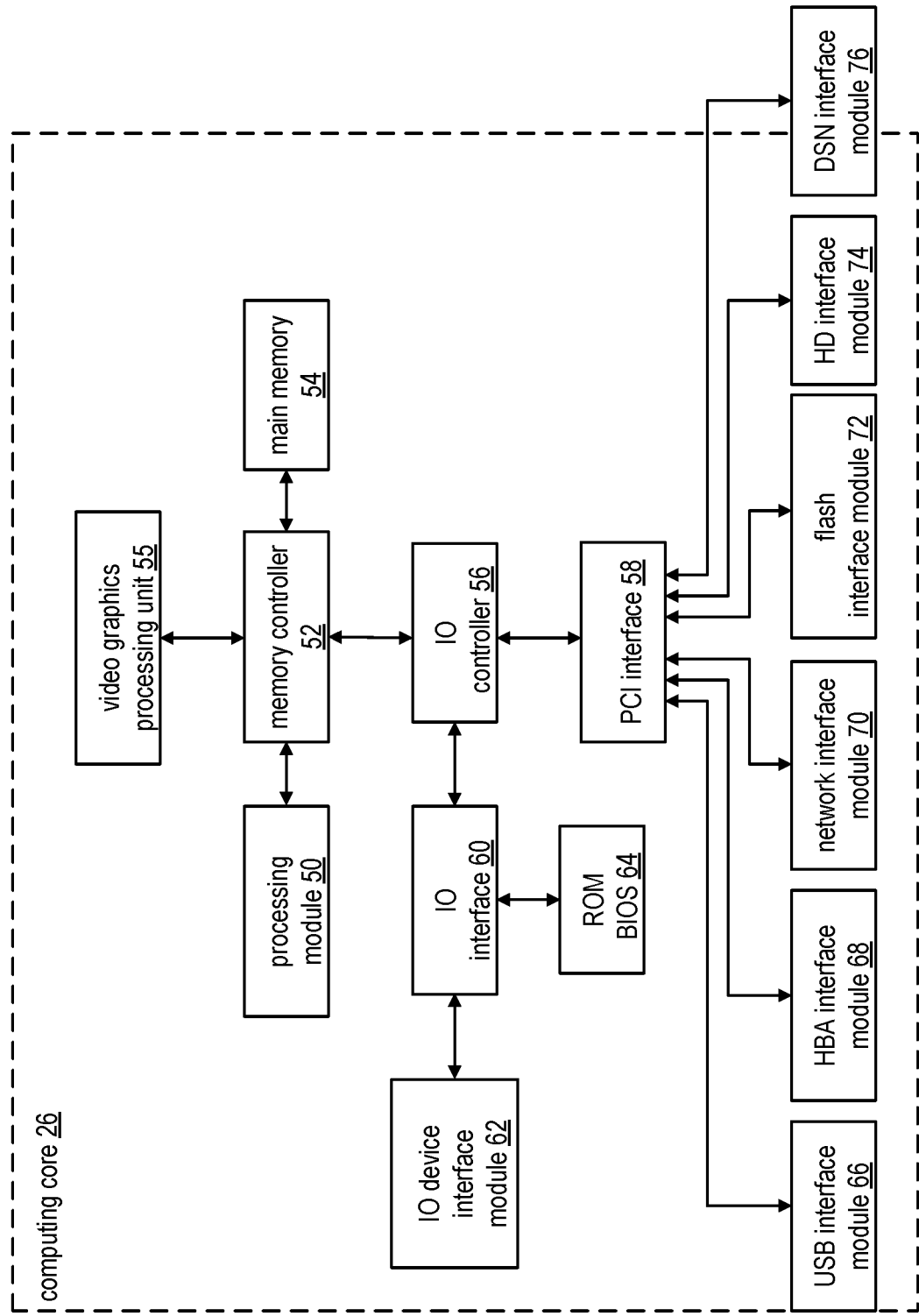
FIG. 2 is a schematic block diagram of an embodiment of a computing core in accordance with various embodiments of the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (10) controller 56, a peripheral component interconnect (PCI) interface 58, an 10 interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM).

The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
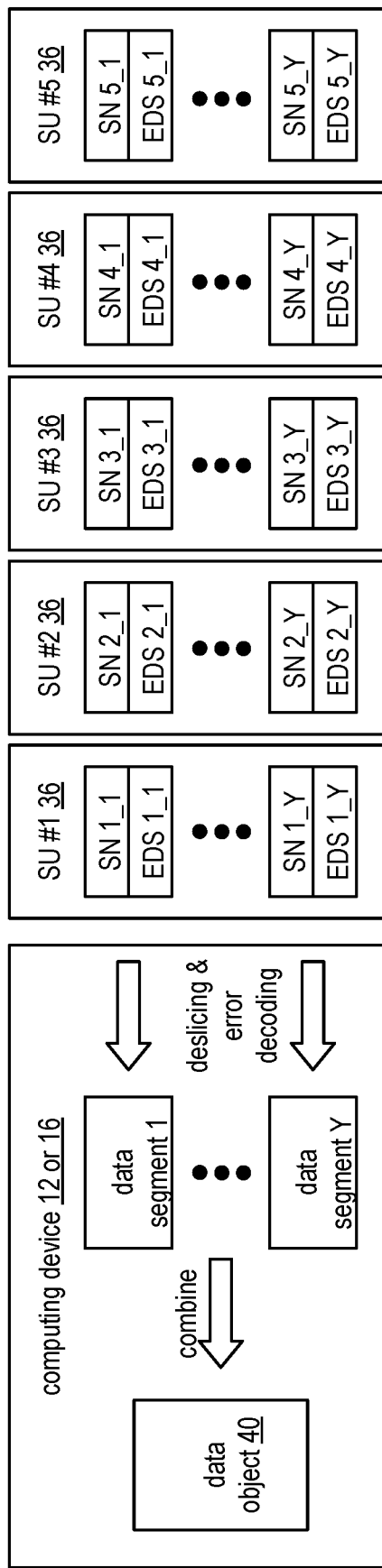
FIG. 7 is a schematic block diagram of an example of dispersed storage error decoding of data in accordance with various embodiments of the present invention.
FIG. 8 is a schematic block diagram of a generic example of an error decoding function in accordance with various embodiments of the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
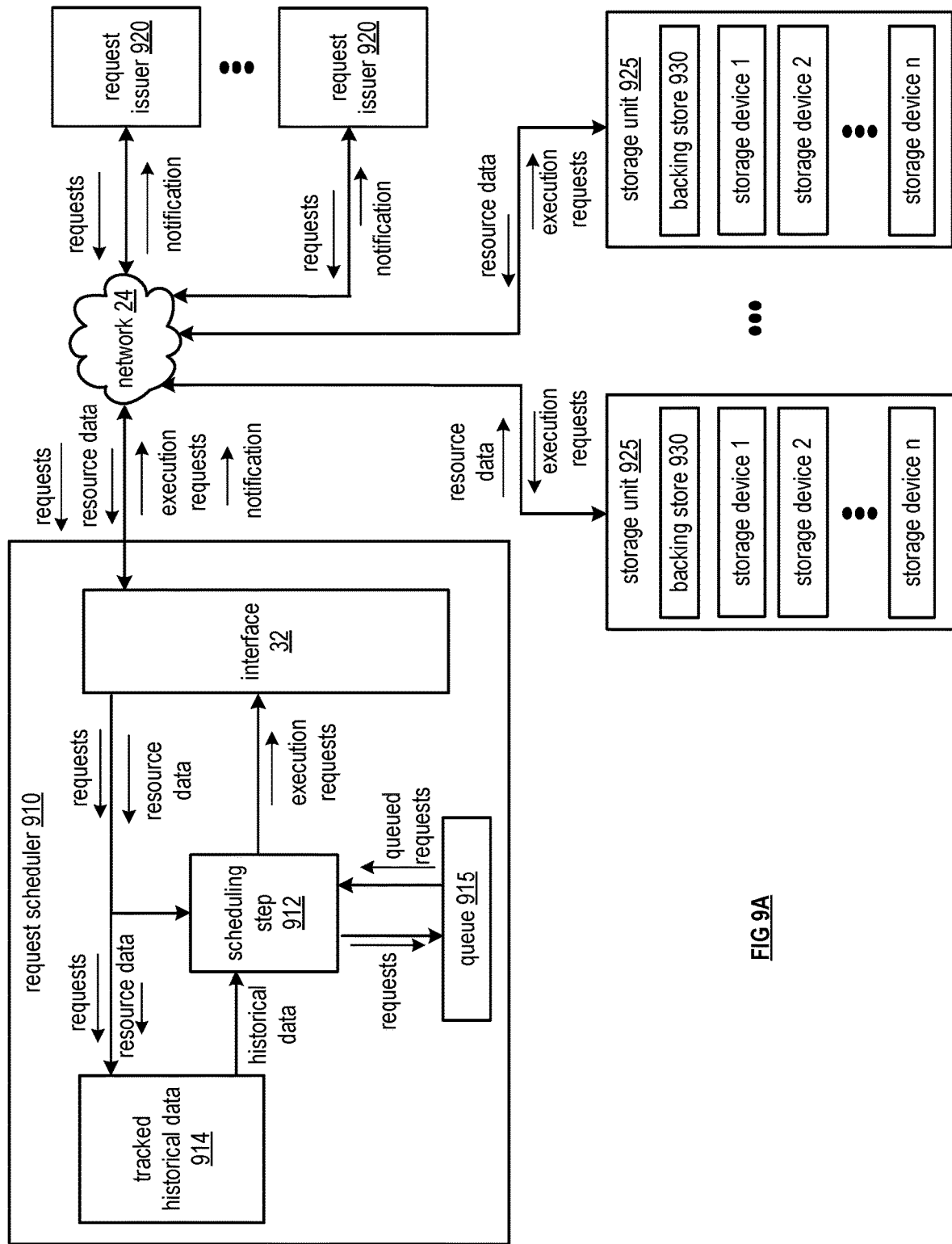
FIG. 9A is a schematic block diagram of an embodiment of a dispersed or distributed storage network (DSN) in accordance with various embodiments of the present invention.

FIG. 9A is a schematic block diagram of another embodiment of a dispersed storage network (DSN) that functions to schedule requests. The DSN of FIG. 9A includes at least one request scheduler 910, at least one request issuer 920, and at least one storage unit 925, communicating via network 24 of FIG. 1. Each storage unit 925 can be implemented utilizing storage units 36 of FIG. 1, and can each include the same or different number of storage devices 1-$n$. Each storage unit 925 can further include at least one backing store 930, which can be implemented utilizing its own processor and memory to store and maintain current information about data stored in some or all of the respective storage devices 1-$n$, and can receive and respond to queries regarding the data stored in some or all of the respective storage devices 1-$n$. In some embodiments, a backing store 930 stores information stores and maintains current information about data stored in multiple storage units 925, for example, receiving updated information from multiple storage units via network 24.

The request scheduler 910 can include interface 32 of FIG. 1 and can utilize at least one processor to execute operational instructions, stored by at least one memory of the request scheduler 910, to perform a scheduling step 912 and/or to perform operations discussed herein. The request scheduler 910 can further utilize the same or different memory and/or the same or different processor to store tracked historical data 914, and/or can utilize the same or different memory and/or the same or different processor to store at least one queue 915 of requests scheduled for execution. The request scheduler can receive requests from one or more request issuers 920 via the network 24 and can perform scheduling step 912 to determine when the requests will be executed. In particular, scheduling the requests can be based on resource data retrieved via the network from storage units 925 and/or from other entities of the network. The resource data can correspond to current state of memory, CPU, and/or bandwidth usage. Alternatively or in addition, the resource data can correspond to values and/or locations of currently stored data, based on information queried from one or more backing stores 930. Alternatively or in addition, some or all of the resource data can include prediction data for future states of the resources, based on tracked historical data 914 and/or the current resource data received via the network. This resource data can be utilized to determine some or all requests be executed immediately and/or that some or all remaining requests be queued in queue 915 for later execution. Whether or not a request will be executed immediately can be further based on the scheduled and/or unscheduled pending requests that are already stored in queue 915, can be based on a priority and/or user requirements received with the requests, can be determined based on evaluating an amount of resources required for each request, and/or can be determined based on determining whether or not resource requirements of some or all of the incoming requests and/or some or all of the queued requests overlap.

Once requests are determined to be executed, the request scheduler 910 can facilitate execution of the request by transmitting corresponding execution requests to corresponding storage units 925 for execution, for example, as one or more transactions. Alternatively or in addition, the request scheduler 910 can send instructions indicating a request is ready to be executed to another entity, such as a computing device 16, where the another entity is responsible for executing the requests in the DSN. The request scheduler 910 can further transmit submission rate notifications to some or all of the request issuers 920, for example, indicating a change in requirement for the rate of submission of requests to the request scheduler 910 by the request issuer 920 and/or otherwise indicating information utilized by the request issuer 920 to determine their rate of submitting requests to the request scheduler 910.

The request scheduler and/or the request issuer can be implemented utilizing the computing device 16 of FIG. 1 and/or the computing device 14 of FIG. 1. The request scheduler and/or request issuer can include a processor and memory, for example, utilizing some or all of the computing core of FIG. 2.

Figure 9B:
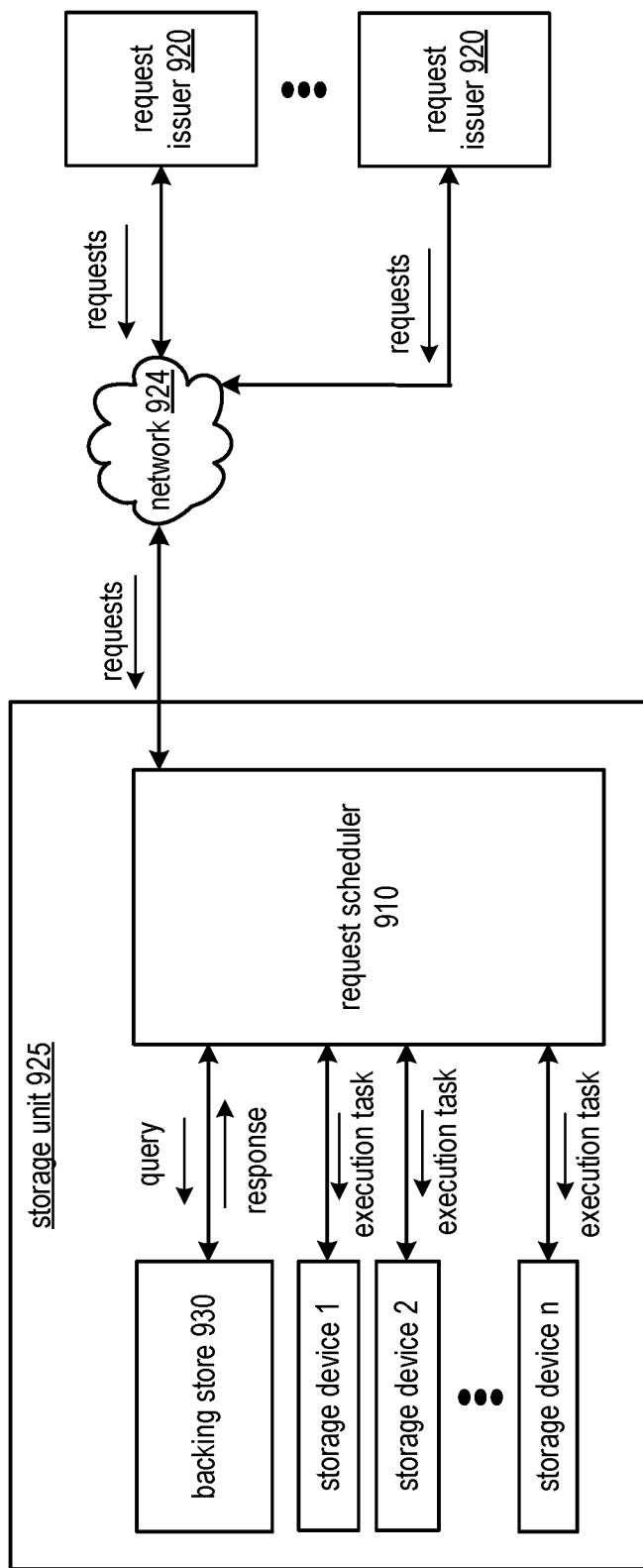
FIG. 9B is a schematic block diagram of an embodiment of a storage unit in accordance with various embodiments of the present invention.

Alternatively or in addition, as shown in FIG. 9B, the same or different request scheduler 910 can be implemented within a storage unit 925 by utilizing processor and memory of the storage unit 925, for example, performing scheduling step 912 on incoming requests sent from a request issuer corresponding to a computing device 16 to schedule these incoming requests for execution, utilizing its own resources, across one or more of its storage devices 1-$n$, where n can be equal to one, or can be equal to a number larger than one. For example, as shown, execution tasks can be sent to the storage devices 1-$n$ as their corresponding requests received from the request issuers are scheduled for execution. The request scheduler 910 can operate in the same fashion as described herein to schedule requests for local execution as execution tasks within one or more storage devices and/or by utilizing one or more local processing resources of the storage unit 925. The storage unit 925 of FIG. 9B can be implemented utilizing the storage unit 36 of FIG. 1, can utilize some or all elements of the computing core 26 of FIG. 2, and/or can otherwise include at least one processor and memory to execute the functions of the request scheduler 910 described herein and to execute the execution tasks within the storage unit 925 once they are scheduled for execution by the request scheduler 910. The requests can be received from the one or more request issuers 920 via a wired and/or wireless network 924, which can be implemented by utilizing network 24 FIG. 9A. The requests can alternatively be received via another connection with the one or more request issuers 920 and/or some or all of the requests can be generated by the request scheduler 910 itself.

When dealing with requests from multiple sources, and/or multiple requests from the same source, it can become necessary to queue and schedule requests to be serviced in a well-defined order, as they may not be able to all be serviced simultaneously. How these requests are scheduled and queued can significantly impact the performance and efficiency of these requests. Servicing requests based on the order in which they are received, first in first out (FIFO) can lead to inefficiencies and delays if there is contention for shared resources. A finite number of requests can be serviced simultaneously, where each request requires a specific set of resources which it competes to acquire. When requests are processed without consideration for how those resources can be consumed, requests may be delayed waiting for available resources when other requests that do not require the same shared resource could be serviced immediately. Taking priority into consideration in addition to order of arrival, as in a priority queue, can allow more important requests to be serviced in a more timely fashion, but can still be inefficient and include unnecessary delay. Servicing different types of requests in different manners, for example based on how a user may perceive different types of requests, can make the system feel more efficient but may not improve the overall performance of the system. Requests that are queued because they are waiting for resources to be available can eventually consume all available queue space resulting in a catastrophic overflow condition or an indefinite block condition, though the submitter may continue attempting to issue more requests.

The present invention improves the efficiency and performance of request scheduling by taking multiple factors into account when deciding the order in which requests should be submitted. This can include utilizing knowledge acquired from a variety of sources to make more intelligent decisions about when requests should be queued and/or executed, and/or to further determine the order in which requests should be executed. This can maximize performance and efficiency of request satisfaction and/or can be utilized to notify issuers of requests for when requests may take an unexpected amount of time to service. This can allow better decisions to be made about when a request is serviced, which allows the request to be serviced in a manner that maximizes performance and minimizes overhead compared to other request scheduling mechanisms. This can allow additional parallelism compared to first in first out queuing mechanisms, and can allows priority requests to continue to be serviced quickly as in the priority queue mechanism but with less impact on noncompeting requests.

A request scheduler 910 can receive a plurality of requests from one or more request issuers 920 to be executed in one or more storage devices. In some embodiments, the one or more memory devices can be included in a DSN, in accordance with FIGS. 1-8, as shown in FIG. 9A. For example, the plurality of requests can correspond to requests for access to and/or requests for execution by at least one of a set of storage units 925 communicating with the request scheduler 910.

In other embodiments, the DSN of FIGS. 1-8 is not utilized. The request scheduler 910 schedule can requests as described herein for a single storage device and/or for a set of storage devices 1-n associated with the request schedule. In some embodiments, the single memory device and/or set of memory device can be accessed by the request scheduler locally, where the memory devices to be accessed to execute the access requests received by the request scheduler 910 are included within and/or are coupled to the request scheduler 910 within the same device, such as within the storage unit 925 as illustrated in FIG. 9B. In such embodiments, the resource contention and knowledge acquired can be local to the request scheduler 910 itself and/or can be local to a storage unit 925 that contains the request scheduler 910.

When multiple requests need to share a fixed resource, such as bandwidth, memory, and/or CPU time, requests whose resource needs do not overlap can be considered separately. For example, a request scheduler 910 can determine a level of contention in the plurality of requests by determining whether or not the resource needs of multiple requests overlap by comparing the data objects and/or memory devices, such as vaults of the DSN or particular storage units of the DSN, that will be accessed by each of the multiple requests to determine whether or not the data objects and/or memory devices accessed in execution of a request will overlap. Alternatively or in addition, the a request scheduler 910 can determine a level of contention in the plurality of requests by determining the total amount or capacity of the fixed resources that are required to service the multiple requests, and by comparing the total amount or capacity of one or more particular resources required to service the requests to a currently available amount or capacity of the one or more fixed resources and/or to a maximum available amount or capacity of the one or more fixed resources.

The request scheduler 910 can schedule the incoming requests based on the determined contention between the incoming requests, one or more already-scheduled requests queued by the request scheduler that were previously received and not yet executed, and/or one or more requests that are currently being executed. A number of requests that must consume a particular set of resources simultaneously can be segregated and bounded within the confines of the available resources to minimize contention and maximize parallelism when multiple parallel resource allocations exist. For example, when requests will need to access hard disk drives in a system with multiple hard drives, requests that do not access the same hard drive can be determined by the request scheduler 910 to be executed simultaneously, while requests that access the same hard drive can be determined by the request scheduler 910 to be executed serially. As another example, multiple requests that will utilize portions of total bandwidth resources, total memory resources, and/or total CPU resources can be scheduled for simultaneous execution if the sum of the portions of bandwidth resources, memory resources, and/or CPU resources required by the multiple requests do not exceed the total, or currently available, bandwidth resources, memory resources, and/or CPU resources. Such requests that are determined to be executed serially can be queued, for example, designated for execution at a time that other requests that utilize overlapping resources have finished executing and/or designated for execution when the required amount of CPU resources, memory, and/or bandwidth becomes available as a result of some or all other requests utilizing these resources complete their execution.

When the one or more queues do start to build, at least one notification can be sent by request scheduler 910 back to one or more requester issuers 920, allowing the one or more request issuers 920 to tune their rate of request submission to a rate the system is capable of efficiently handling. One or more notifications can be sent in response to the length of the queue exceeding a threshold, the number of requests in the queue exceeding the threshold, and/or the expected amount of time to complete some or all requests in the queue exceeding a threshold.

In some embodiments, the at least one notification can be sent in response to the queue exceeding a threshold. In some embodiments, the notification can be sent to a particular request issuer 920 in response to receiving a request from that request issuer 920 that is accessing a contended resources and/or is being added to a queue that exceeds a threshold or is otherwise determined to be long.

The at least one notification can include a request that one or more request issuers 920 slow down their rate of submission, and/or can request that one or more request issuers 920 begin queueing and/or buffering at least some of their requests. As discussed herein, the submission rate requirement can correspond to a request for a raising or lowering of submission rate and/or a desired submission rate, rather than a hard requirement. For example, the submission rate requirement can correspond to a request to the request issuers 920 to slow down their rate of submission by a non-exact amount, without indicating a particular required change in submission rate or a particular submission rate that must be met. The submission rate requirement sent in a notification to a request issuer can also correspond to instructions to resume normal transmission and/or send requests at any rate, for example, if a notification to request that rate of submission of requests be slowed down was previously sent to the request issuer.

In some embodiments, the at least one notification serves to alert the request issuer 920 that the queue is currently long, that their requests require access to contended resources, and/or that some or all of their received requests and/or future incoming requests may take longer to execute. The request issuer 920 can thus choose whether or not to decrease its rate of request submission in response to receiving the notification that includes this information, for example, based on the knowledge that completion of their requests will and/or is expected to take longer than usual.

In some embodiments, the same or different submission rate requirements can be sent in notifications to different request issuers 920, for example, where some requestors are asked to slow down their rate of request submission and others are not. For example, a first request issuer 920 that issues higher priority requests or consistently sends higher traffic of requests may be allotted a higher submission rate than a second request issuer 920 that infrequently sends requests and/or sends lower priority requests. Alternatively, the first request issuer may be sent a request to lower their submission rate in response to their heavy use of the resources managed by the request scheduler 910, while the second request issuer may not be required to lower their submission rate in response to their lighter use of the resources managed by the request scheduler 910.

Alternatively, the at least one notification can be sent in response to any requests being added to the queue, where the notification includes queue size information, current resource contention levels, and/or request submission rate requirements determined by the request scheduler 910 based on the current size, number of requests, or expected amount of time to complete some or all requests in the current queue. For example, in response to receiving such a notification with this information, the request issuer 920 can choose to adjust their request submission rate in response to changing conditions of the queue received in the notifications from the request scheduler 910 over time.

This monitoring of the queue and/or controlling of the request submission rate can allow the request scheduler 910 to define an anticipated service time for existing requests. This anticipated service time, when relayed to request issuers 920 in the notification indicating the current queue conditions and/or the request submission rate, can allow the request issuers 920 to better plan their own workload. The request issuer 920 can maintain their own queue of requests to be sent to the request scheduler 910, where some requests are queued and/or scheduled by the request issuer 920 if sending these requests would exceed the submission rate requirements indicated by the request scheduler in the notification. For example, each request issuer 920 can maintain their own queue 915, queuing requests as necessary to adhere to the current submission rate requirements, current queue length and/or current expectations for how long it would take for their requests to be processed. Each request issuer 920 can determine which requests to send to request scheduler 910 and which requests to queue based on the size of the requests, based on expected resource consumption of the requests, based on priority of the requests, based on known contention between their requests and currently executing or pending requests of the request scheduler 910, urgency of the requests, a user associated with the requests, and/or based on some or all of the requirements utilized by the request scheduler 910 to schedule their incoming requests.

Some or all of performing scheduling step 912 can include analyzing the historical data and/or utilizing the prediction data. The request scheduler 910 can track historical data for how requests are issued and serviced, for example, by tracking the rate of incoming requests over time, by tracking the time it takes to service requests over time, by tracking the size and/or number requests in the queue over time, by tracking the consumption of resources required to execute the requests over time. This tracked historical data 914 can be stored and/or analyzed by the request scheduler 910 over time to allow the request scheduler 910 to generate predication data that includes expected future load and/or expected future service times. This prediction data can be utilized to enable the request scheduler 910 to make better decisions in scheduling future incoming requests. For example, when requests are known to need to reach a slower disk as compared to a faster disk, more requests can be passed through to the faster disk as they can be expected to complete more quickly. As another example, if the underlying storage mechanism and/or storage medium experiences lower latency, then issuing more requests can be more efficient as the time between requests where the storage may otherwise be idle can be minimized. Some or all of the resource data received and/or generated over time can added to the tracked historical data 914 to maintain the tracked historical data over time.

Some or all of performing scheduling step 912 can include considering the size of incoming requests with respect to their impact on available resources. This can enable the request scheduler 910 to make better decisions with regard to how many requests can use the resources simultaneously, and/or better decisions about sending higher priority requests can be made. For example, a larger, higher priority request may be allowed to be sent ahead of multiple smaller requests if it will fit within the confines of the remaining resources available. Otherwise, this larger higher priority request can be delayed if it does not fit within the confines of the remaining resources, and in response, the request scheduler 910 can also delay queued and/or incoming smaller requests so that the resources can be made available for the higher priority request. In particular, a number of smaller requests of equal priority can be delayed if their execution would prevent the large, higher priority request from being executed even though resources exist for the smaller requests to be executed immediately. In this scenario, the large, higher priority request is not immediately executed because there are currently not enough resources available, but is immediately executed once currently running requests complete execution and free up the required resources, and any intermittent, small, lower priority resources that could otherwise be executed using the limited resources available during this time are queued and/or otherwise delayed until the large, higher priority request can be executed.

Some or all of performing scheduling step 912 can include scaling the size of one or more queues 915 of requests depending on available resources, allowing the system to more gracefully accept new requests that it might not have otherwise been able to handle with a fixed size queue. By scaling as resources are available, more requests can be queued up by the request scheduler 910, which can then subsequently be considered with the other bodies of knowledge, and may be able to be executed sooner than if the request were held by the issuer until a later time. In particular, the scale of the size of one or more queues can increase linearly and/or as another increasing function of increasing availability of resources. As resources become unavailable, the size of the one or more queues can decrease in accordance with this function. In some embodiments, multiple queues are utilized, where each queue corresponds to a different set of distinct resources, where the set of resources of the multiple queues are non-overlapping. Requests are added to the queue corresponding to the set of resources they require, and requests from different queues can be executed simultaneously by the request scheduler 910 as they do not utilize the same sets of resources. Each queue can independently increase and decrease in size with the availability of their corresponding set of resources in accordance with the same and/or different function. In some embodiments, the prediction data generated in the tracking of historical data can be utilized to preemptively scale queues. For example, a queue can be increased in size at a particular time if a set of resources are predicted to become available at that time based on the tracked historical data.

Some or all of performing scheduling step 912 can include utilize knowledge about a request to estimate its future resource requirements to better plan whether a request should be executed immediately or delayed for when more resources are available. For example, if the resource requirements for a request are not explicit and/or are dependent on other outside factors during execution of the request, the request scheduler 910 can determine and/or predict the resources that will be consumed in execution of the request. For example, reading data from disk will require memory to store the read data, but the amount of memory to hold the request to read data from disk may be very small. Using the estimates for how large the amount of memory likely to be needed can allow the scheduler to decide if sufficient memory exists to service the read or if it should wait until more memory is available. The request scheduler can utilize the tracking of historical data to predict the resource consumption for a particular request, for example, based on the resources consumed for similar requests in the past. The request scheduler can further determine and/or predict when the estimated amount of necessary resources are likely to become available for a particular request, based on the determined estimates for other requests currently being executed and/or for requests scheduled for execution before the particular request. Determining and/or predicting when the estimated amount of necessary resources are likely to become available for the particular request can also be based on utilizing the tracking of historical data, for example, to predict the resource consumption for requests currently being executed and/or to predict future resource consumption based on other factors by utilizing corresponding information tracked in the historical data. In these cases, the request scheduler 910 can schedule execution of the particular request for the time when the estimated resources are determined to likely to become available, and/or the request scheduler 910 can send a notification to the request issuer 920 from whom the particular request was received, indicating the scheduled and/or estimated time that the request will be executed based on this determination, allowing the request issuer 920 to have a better idea of when requests will be executed by the request scheduler 910.

Some or all of performing scheduling step 912 can include utilizing a backing store 930 to schedule requests. As illustrated in FIG. 9A, the DSN can include one or more backing stores 930. Each backing store 930 can indicate identifiers of data stored in the corresponding memory, can indicate current values of data stored in the corresponding memory, and/or can indicate whether or not a portion of corresponding memory is occupied. Alternatively, a single backing store can indicate such information for memory across multiple storage devices within a same storage unit and/or can indicate such information for memory across multiple storage units. For example, as illustrated in FIG. 9B, backing store 930 can indicate current values of data stored in memory of storage devices 1-n, and/or can indicate whether or not a portion of memory of storage units 1-n is occupied.

Backing store 930 can utilize its own one or more processors and/or designated portion of memory, utilized to store information about the other memory and/or resources of the one or more memory devices and/or one or more storage units it services, for the purpose of satisfying queries from the request scheduler 910 for this information. Backing store 930 can be updated and/or maintained by its corresponding storage unit and/or another processing device responsible for executing requests and/or otherwise associated with the corresponding memory.

In particular, the request scheduler 910 can perform efficient queries against the backing store 930 for a particular request to determine whether the particular request is likely to be successful, for example, as illustrated in FIG. 9B. Checking whether the particular request is likely to be successful, and/or only attempting to execute the request in response to first determining the particular request is determined to likely to be successfully, can minimize the cost of performing the request. For example, similar to a bloom filter, a query can be issued to the backing store 930 by request scheduler 910 for whether some piece of data exists. If the backing store can reply that it definitely does not exist, without a potentially-slower read from the media to make this same determination, the cost of performing the request may be very low in the case where the data does not exist. Checking whether the request is likely to be successful can include querying one or more backing stores 930 corresponding to one or more memories storing data associated with the request, for example, where multiple backing stores corresponding to multiple storage units or particular storage devices within the same storage unit are queried when the request involves data stored in the multiple storage units and/or the multiple particular storage devices.

One or more backing stores 930 can be further queried by the request scheduler 910 to estimate the cost of performing a particular request. The request scheduler 910 can execute more requests that have a lower cost and fewer with a higher cost, and/or can avoid burdening the underlying backing store which may be less efficient when excessively loaded. The backing store 930 can store and/or utilize a processor to determine resource cost estimate for a particular request, for example, based on evaluating and/or storing current information about the resources of the corresponding one or more memory devices and/or one or more storage units, based on the size and/or location of the data indicated in the request, and/or based on the type of access and/or operations to be performed on the data indicated in the request. Some or all of these estimates can be determined by the request scheduler 910 based on information received from the backing store in response to the query and/or further based on other knowledge utilized to estimate resource and/or time costs to performing the particular requests as discussed herein.

Some or all of performing scheduling step 912 can include coalescing requests that share locality and/or that can be serviced as part of the same request to the backing store, allowing for fewer requests to be issued that can be processed more efficiently as part of a small number of operations. For example, the request scheduler 910 can determine that a set of requests involve access to the same memory devices and/or involve access to the same data. This can be determined based on querying against the backing store 930 and/or can otherwise be determined by the request scheduler 910. Rather than serially executing these requests separately, such requests can be combined in a single transaction for execution as a single request. This can include serially evaluating the multiple requests, and utilizing this evaluation in the single transaction. Serially evaluating the multiple requests can include querying the backing store for the location of and/or value of data involved in the requests, performing the multiple requests locally by utilizing the location of and/or value of data received from the backing store to determine an expected result of performing the multiple request, and/or utilizing the expected result to execute the multiple requests as a single transaction, where the single transaction is only committed when the expected result is determined to match the actual result of the transaction.

In some embodiments, some or all of the access requests can include reads, writes, deletes, and/or updates to data slices. The request scheduler 910 and/or one or more other computing devices 16 and/or user devices 14 can generate the data slices for storage by performing a dispersed storage error encoding function on a set of data segments for storage, where the encoded data slices of a data segment are transmitted to an information dispersal algorithm (IDA) width threshold number of storage units, for example, as part of one or more write requests to store a data object that includes the set of data segments. The request scheduler 910 and/or one or more computing devices 16 and/or user devices 14 can recover a data segment by retrieving at least an IDA decode threshold number of encoded data slices from at least a corresponding IDA decode threshold number of storage units, and by performing a dispersed storage error decoding function on the received encoded data slices, for example, as part of one or more read requests for the data object. In some embodiments, multiple requests to different data slices of the same data segment and/or same data object are determined to be overlapping and/or are determined to be overlapping, for example, where such requests are thus determined to be serially executed and/or coalesced into a single request.

In various embodiments, a processing system of a request scheduler, or other computing device of a DSN, includes at least one processor and a memory that stores operational instructions, that when executed by the at least one processor cause the processing system to receive a set of requests for execution from at least one request issuer. Resource requirements are determined for each of the set of requests, and current resource availability data is determined for resources indicated in the resource requirements. Scheduling data is generated for the set of requests based on the resource requirements and the current resource availability data, where generating the scheduling data includes identifying a first subset of the set of requests and a second subset of the set of requests. The first subset of the set of requests are added to a queue in response to the scheduling data indicating the first subset of the set of requests be queued for execution. Execution of the set of requests is facilitated in accordance with the scheduling data by facilitating immediate, simultaneous execution of the second subset of the set of requests and by facilitating serial execution of the first subset of the set of requests. The first subset of the set of requests are from the queue in response to facilitating execution of the first subset of the set of requests.

Figure 10:
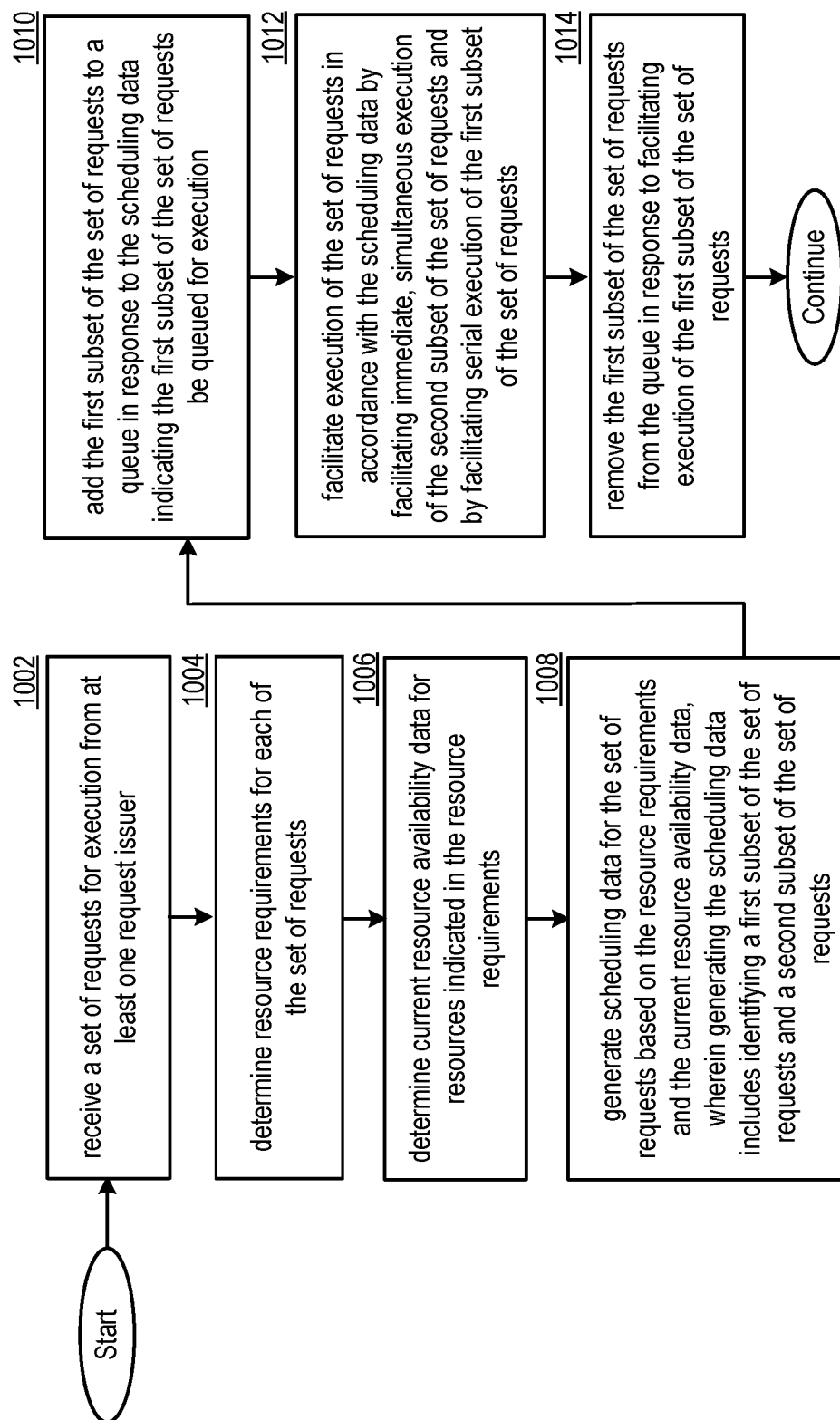
FIG. 10 is a logic diagram of an example of a method of scheduling requests in accordance with the present invention.

FIG. 10 is a flowchart illustrating an example of scheduling requests. In particular, a method is presented for use in association with one or more functions and features described in conjunction with some or all of FIGS. 1-9B, for execution by a request scheduler 910 that includes a processor or via another processing system, for example, of a dispersed storage network or within a storage unit, that includes at least one processor and memory that stores instruction that configure the processor or processors to perform the steps described below.

Step 1002 includes receiving a set of requests for execution from at least one request issuer, for example, via a network. Step 1004 includes determining resource requirements for each of the set of requests. Step 1006 includes determining current resource availability data for resources indicated in the resource requirements. Step 1008 includes generating scheduling data for the set of requests based on the resource requirements and the current resource availability data. Generating the scheduling data can include identifying a first subset of the set of requests and a second subset of the set of requests. The first subset and second subset can be mutually exclusive and collectively exhaustive with respect to the set of requests. Step 1010 includes adding the first subset of the set of requests are added to a queue maintained by the request scheduler in response to the scheduling data indicating the first subset of the set of requests be queued for execution. Step 1012 includes facilitating execution of the set of requests in accordance with the scheduling data by facilitating immediate, simultaneous execution of the second subset of the set of requests and by facilitating serial execution of the first subset of the set of requests. For example, the scheduling data can further indicate an ordering of the set of requests for execution, such as a serial ordering of the first subset of the set of requests in the queue, and the set of requests can be executed in accordance with the ordering. Step 1014 includes removing the first subset of the set of requests from the queue in response to facilitating execution of the first subset of the set of requests, for example, where requests are each removed from the queue as their execution is initiated or completed.

In some embodiments, the scheduling data can indicate that one or more previously queued requests be immediately executed, for example, in conjunction with immediate execution of the second subset of requests. In some embodiments, the scheduling data indicates the next requests of the set of requests and/or that previously queued requests in the queue be executed once one or more currently executed requests are completed.

Scheduling data can be generated multiple times for the set of requests, each time indicating only a subset of the queued requests that are selected for execution based on the resource data. In some embodiments, scheduling data is generated in response to determining a currently executed request has completed, for example, to dictate one or more requests in the queue that will be executed next in response to completion of the currently executed requests. In some embodiments, scheduling data is generated in response to determining resources required by one or more request has become available and/or has increased in capacity, for example, to dictate one or more requests in the queue that will be executed next in response to the corresponding required resources becoming available and/or increasing in capacity. In particular, a proper subset of the requests in the queue that require the newly available resources can be identified and evaluated, where a smaller subset of this proper subset of requests is selected for execution utilizing the newly available resources.

In some embodiments, the set of requests are received individually as a stream of incoming requests over time, and scheduling data is generated in response to receiving each individual request. In some embodiments, all incoming requests are added to the queue by default, and each time scheduling data is generated, generating the scheduling data includes evaluating all requests in the queue to determine which one or more requests will be executed immediately and/or will be executed as soon as a required resources become available. In this fashion, as incoming requests are received, queued for execution, and eventually executed over time in accordance with the scheduling data in steps 1002-1014, steps 1002-1014 can be repeated over time as new requests are received and/or new scheduling data is generated over time.

In various embodiments, as the incoming requests are received, queued for execution, and eventually executed over time, the request scheduler can further generate queue size data by monitoring the length of the queue. For example, the length of the queue can correspond to a current number of requests in the queue, an expected amount of time to complete the requests in the queue, and/or an amount of resources required or expected to be required to execute the requests in the queue. As another example, the length of the queue can be an inverse function of remaining queue capacity, where the length of the queue plus the remaining queue capacity is equal to a total, fixed capacity of the queue. This monitoring can be performed constantly, can be performed in pre-defined intervals, and/or can be performed automatically every time one or requests is removed from or added to the queue.

The length of the queue can be compared to a queue maximum threshold as this monitoring continues, and in response to determining the length of the queue indicated in the queue size data compares unfavorably to a queue maximum threshold, a notification can be sent to the at least one request issuer indicating the long length of the queue. In some embodiments, the notification can indicate a submission rate requirement, which can be directly proportional to and/or is an increasing function of remaining queue capacity. The submission rate can be lowered in response to the length of the queue increasing (and thus the remaining queue capacity decreasing), by an interval in accordance with the increasing function, and where the submission rate is raised in response to the length of the queue decreasing (and thus the remaining queue capacity increasing). Changes in requested submission rate can be relayed to request issuers in the notifications sent back to the request issuer from the request scheduler. Alternatively, these notifications can serve to notify the request issuers of change in queue length conditions, and request issuers can determine whether to respond by locally queueing some of their own requests and/or to otherwise send requests at a different rate based on this information.

Future requests can be received at a lower rate, for example, in response to the at least one request issuer determining to locally queue more of their own requests and/or to otherwise send requests less frequently a period of time after receiving the notification and/or until receiving another notification from the request scheduler indicating that the queue size no longer exceeds the maximum threshold. For example, the request scheduler can send such a notification in response to determining the queue size again compares favorably to the queue maximum threshold as monitoring of the queue size continues over time.

In various embodiments, the resource data includes contention data. The contention data can be generating based on determining overlapping resource requirements amongst different ones of the set of requests, for example, where the contention data indicate one or more groupings of overlapping ones of the set of requests with overlapping resources, and/or can indicate one or more non-overlapping ones of the set of requests with non-overlapping resources. The scheduling data can indicate the first subset of the set of requests be included in the queue for serial execution in response to the contention data indicating that the first subset of the set of requests have overlapping resource requirements. The scheduling data can indicate simultaneous execution of a second subset of the set of requests in response to the contention data indicating that the second subset of the set of requests do not have overlapping resource requirements. Facilitating execution of the set of requirements can include gradually executing, serially, the first subset of the set of requests. Facilitating execution of the set of requirements can further include simultaneously executing the second subset of the set of requests, for example, immediately if required resources are currently available. In some embodiments, determining whether overlapping resource requirements exist can include determining whether memory locations accessed in the requests overlap, whether particular data accessed in the requests overlaps, whether different requests access the different data slices of the same data object and thus overlap, and/or whether the required usage of particular memory and/or processors to execute the request overlap.

Alternatively or in addition to utilizing this contention data to generate the scheduling data, the method can further include determining resource requirements for some or all of the set of requests, and determining current resource availability data for resources, such as resources that correspond to a set of resources indicated in the resource requirements. The resources can correspond to resources utilized across the DSN or can correspond to local resources, such as resources within a storage unit that contains the request scheduler and at least one storage device serviced by requests managed by the request scheduler. Generating the scheduling data can include identifying the second subset of the set of requests for immediate, simultaneous execution based on determining total resource requirements of the second subset of the set of requests compare favorably to the current resource availability data. The second subset can include multiple requests, and the scheduling data can include allocating distinct portions of currently available CPU, memory, and/or bandwidth for each request in the subset to accommodate for the immediate, simultaneous execution of the multiple requests. In some embodiments, some or all of this second subset of the set of requests are instead queued for serial execution in response to also determining these requests include overlapping resources. In some embodiments, the second subset of the set of requests are selected for immediate, simultaneous execution in response to also determining they require non-overlapping resources amongst themselves and/or amongst requests that are currently being executed.

Determining whether or not one request will be executed can include determining whether or not the resource requirements of the one request compare favorably to the current resource availability data, where the request can be selected for execution when the resource requirements of the one request compare favorably to the current resource availability data, indicating the required resources to execute the request are currently available. Similarly, determining whether or not multiple requests will be simultaneously executed can include determining whether or not the summation of the resource requirements for the multiple requests compare favorably to the current resource availability data, where the multiple requests can be selected for simultaneous execution when the summation of resource requirements of the multiple requests compare favorably to the current resource availability data, indicating all the required resources to execute the multiple request simultaneously are currently available.

In various embodiments, the set of requests include an access request for data stored in at least one of a plurality of storage units of the DSN. The method can further include generating a query for resource availability for transmission, via a network, to the at least one of a plurality of storage units of the DSN, and the current resource availability data can be received from the at least one of the plurality of storage units in response to the query. For example, the current resource availability data received from each storage unit can correspond to current bandwidth, CPU, and/or memory availability of the storage unit itself, for example, monitored by a processing unit of the storage unit itself. Alternatively or in addition, the current resource availability data can be queried from other elements of the DSN and/or can be received from one or more entities of the DSN in regular intervals. Alternatively or in addition, the current resource availability data can be queried locally, for example, from one or more storage devices within a storage unit that contains the request scheduler, from a backing store within the storage unit that contains the request scheduler, or from another entity within the storage unit that contains the request scheduler that monitors resources available within the storage unit.

Historical data can be utilized to estimate the resource requirements to execute some or all of the requests, for example, if the resource requirements aren't explicitly indicated in the request and/or otherwise cannot be definitively determined unit the request is executed. The method can include retrieving historical data tracked by the request scheduler, where the historical data indicates actual resource requirements determined for a plurality of previously executed requests. The resource requirements can be determined by generating prediction data, where the prediction data indicates expected resource requirements for the set of requests based on the historical data. Thus, the resource requirements can correspond to an estimate indicated by the expected resource requirements calculated in generating the prediction data based on the historical data. The historical data can be updated over time, for example, where the historical data is updated based on the resource requirements and/or current resource availability data that is determined or estimated for the current set of requests.

In particular, the method can include identifying a subset of similar ones of the plurality of previously executed requests for each of the set of requests, where the expected resource requirements are determined for the each of the set of requests based on the actual resource requirements of the subset of similar ones of the plurality of previously executed requests. The method can further include determining actual resource requirements for the set of requests in response to facilitating execution of the set of requests, for example, based on determining which resources were actually used to execute the requests and/or by estimating the resource cost to execute the request based on the time taken to execute the request. These actual resource requirements determined for the requests can be utilized to update the historical data, where the updated historical data includes the actual resource requirements for the set of requests, for example, where the second scheduling data and/or prediction data generated for future requests is generated by utilizing the updated historical data.

In various embodiments, the actual resource requirements of the historical data indicate actual CPU usage requirements of the plurality of previously executed requests. The expected resource requirements can indicate expected CPU usage requirements for the each of the set of requests, for example, based on the actual CPU usage requirements of the subset of similar ones of the plurality of previously executed requests. Alternatively or in addition, the actual resource requirements of the historical data indicate actual memory capacity requirements of the plurality of previously executed requests. The expected resource requirements can indicate expected memory capacity requirements for the each of the set of requests, for example, based on the actual memory capacity requirements of the subset of similar ones of the plurality of previously executed requests. Alternatively or in addition, the actual resource requirements of the historical data indicate actual execution duration times of the plurality of previously executed requests. The expected resource requirements can indicate expected execution duration times for the each of the set of requests, for example, based on the actual execution duration times of the subset of similar ones of the plurality of previously executed requests. The set of similar ones of the plurality of previously executed requests can identified based on a location of data indicated in the similar ones of the plurality of previously executed requests comparing favorably to a location of data indicated in the each of the set of requests; a size of data indicated in the similar ones of the plurality of previously executed requests comparing favorably to a size of data indicated in the each of the set of requests; a type of access indicated in the similar ones of the plurality of previously executed requests comparing favorably to a type of access indicated in the each of the set of requests; and/or in response to otherwise having similar attributes to the respective request.

This historical data can instead or additionally be utilized to estimate the current resource availability data. Some or all of the current resource availability data of one or more elements of the DSN such as the one or more storage units and/or storage devices can be calculated and/or estimated based on execution metrics tracked for previous requests, for example, retrieved from the historical data and/or most recently determined for most recently executed request. Alternatively, some or all of the current resource availability data of one or more resources, such as one or more storage devices, within the storage unit that contains the request scheduler can be calculated and/or estimated, for example, based on the time taken to execute a previous request and/or the time taken to receive confirmation that a previous request was executed. This can further be compared to an expected average time this type of request is expected to be completed, for example, where the expected average time is determined based on the historical data, to determine whether the actual time taken to process recent requests is faster or slower than usual to indicate if resources are being strained or are readily available. The method can further include determining the current resource availability data by generating second prediction data, where the second prediction data indicates expected current resource availability data for the set of requests based on the historical data.

In various embodiments, generating the second prediction data includes determining expected resource requirements for a second set of requests currently being executed based on the historical data. Determining these expected resource requirements for currently executed requests can be the same or different from predicting expected resource requirements for requests that have not yet been executed. Determining these expected resource requirements for currently executed requests can further be based on current metrics determined in the DSN and/or determined locally within a storage unit that includes the request scheduler, for example, to indicate the current bandwidth, CPU, and/or memory consumption in conjunction with execution of these currently executed requests. The expected current resource availability data can be determined based on subtracting a sum of the expected resource requirements for the second set of requests that are currently being executed from a total resource capacity. For example, the method can include determining to execute one queued requests with expected resource requirements that do not exceed this expected current resource availability of one or more required resources indicated in the expected current resource availability data. As another example, the method can include determining to execute multiple queued requests with summation of respective expected resource requirements that do not exceed this expected current resource availability of one or more required resources indicated in the expected current resource availability data.

In various embodiments, in addition to determining and/or estimating the resource requirements for each of the set of requests and determining and/or estimating the current resource availability data, the method can include determining a plurality of priority values corresponding to the set of requests. The scheduling data can be generated to execute the requests in accordance with an ordering based on priority. In some cases, this can include reserving resources and waiting for a time that a high priority request that requires a large amount of resources, which are not currently available, can be executed. Even if one or more lower priority requests could be immediately executed and/or executed before the high priority request because they require fewer resources, these lower priority requests remain queued until the high priority request is able to be completed, and can be executed in accordance with ordering of their respective priorities and/or can be otherwise executed after the high priority request.

Thus, the method can include identifying a highest priority one of the set of requests with a most favorable one of the plurality of priority values. Alternatively or in addition, this one of the set of requests is identified in response to determining the corresponding one of the plurality of priority values compares favorably to a high priority threshold. The method can include determining to execute the highest priority one of the set of requests first, before all other ones of the set of requests, in response to the highest priority one of the set of requests having the most favorable one of the plurality of priority values and/or comparing favorably to the high priority threshold, for example, if the all other ones of the set of requests do not compare favorably to the high priority threshold. The highest priority one of the set of requests can be queued in response to determining the current resource availability data compares unfavorably to the resource requirements of the highest priority one of the set of requests. Determining the current resource availability data compares unfavorably to the resource requirements of the highest priority one of the set of requests can include determining the resource requirements for the highest priority one of the set are not currently available, or are not expected to be currently available, for example, due to one or more previous request currently being executed and utilizing at least some or the required resources. The all other ones of the set of requests can be queued in response to determining to execute the highest priority one of the set of requests first.

In some cases, the current resource availability data compares favorably to the resource requirements of at least one of the all other ones of the set of requests, and/or compares favorably to a summation of multiple ones of the all other ones of the set of requests. In particular, resource requirements for one or more of the all other ones of the set of requests may be determined to be currently available, where the one or more of the all other ones of the set of requests could be immediately be executed. However, these one or more of the all other ones of the set of requests are instead queued, as they are scheduled for execution after the highest priority one of the set of requests. Alternatively, in other embodiments, when at least a threshold number of other requests could be simultaneously be executed with the currently available resources indicated in the current resource availability data, for example, where this threshold number of other requests are determined to be non-overlapping and could utilize independent portions of the required resources, the at least a threshold number of other requests are executed before the highest priority request in response to the number comparing favorably to the threshold.

In embodiments where the highest priority request is designated for execution first, the method can include later determining updated current resource availability data, where the updated current resource availability data compares favorably to the resource requirements of the highest priority one of the set of requests, for example, in response to the at least one previous request completing execution. As required resources for the highest priority one of the set of requests have been determined to have become available, execution of the highest priority one of the set of requests is facilitated in response. Execution of the all other ones of the set of requests are then facilitated in response to determining execution of the highest priority one of the set of requests has been initiated and/or has been completed, in accordance with the scheduling data. For example, these other ones of the set of requests are each executed when the corresponding current resource availability data compares favorably to the resource requirement data of a designated next one of the set of requests in the queue, based on a priority ordering.

As another example, ones of the set of requests are each executed when any corresponding current resource availability data compares favorably to the resource requirement data, for example, where any one of the set of requests are pulled from the queue in any order as soon as it is determined that the resource requirements for the any one of the requests have become available. In this fashion, the requests may be inherently ordered for execution based on the amount of resources they require, as the resources for a request that requires a smallest amount of resources may become available before a request that requires a larger amount of resources. Alternatively, as different requests may have resource requirements indicating non-overlapping sets of resources, the requests can be executed as soon as their respective set of resources becomes available, which may be based on completion of execution of a previous request that uses some or all of this same set of resources. In some embodiments, determining the next request to be executed can be a function of multiple factors, including the priority of the request, a timestamp indicating the amount of time the request has been in the queue, the contention value whether or not there is contention with other requests in the queue or currently executed requests and the amount of resources the request requires for execution. An ordering value of a request in the queue can be a function of these factors, becoming more favorable as a combination of being more favorable with higher priority, being more favorable as the time the request has been in the queue lengthens, being more favorable if there is less or no contention with other requests in the queue and/or with other requests currently being executed, and/or being more favorable if the amount of resources the request requires for execution and/or are currently available. One or more requests with most favorable ordering values can be selected for execution next as resources become available.

In various embodiments, the method can further include changing the total capacity of the queue, for example, by scaling the total capacity of the queue in response to changes in resource availability. This can include increasing the total capacity of the queue as a function of the an increase in resource availability indicated in the most recent current resource availability data. This can include decreasing the total capacity of the queue as a function of the a decrease in resource availability indicated in the most recent current resource availability data. In some embodiments, the total capacity of the queue can never exceed a maximum total capacity, and/or the total capacity of the queue can never be less than a minimum total capacity. In some embodiments, submission rate requirements issued to request issuers can similarly increase and decrease as a direct and/or increasing function of the respective increase and/or decrease in total capacity of the queue.

In particular, the method can include determining to increase the total capacity of the queue in response to the current resource availability data indicating an increase in resource availability from a previous resource availability. In various embodiments, request issuers are notified of this increase in queue capacity. For example, a notification can be sent to the at least one request issuer indicating the increase in capacity of the queue. The request issuer can determine to send its requests at a higher rate and/or can determine to forward one or more locally queued requests to the request scheduler in response to receiving the notification that the queue capacity has increased.

In various embodiments, the method includes transmitting at least one query, via the network, to at least one backing store, for example, where a backing store is associated with a storage unit and/or at least one memory of the DSN. Alternatively, the backing store can be included within a storage unit that contains the request scheduler for at least one storage device of the storage unit. The method further includes receiving at least one notification from the at least one backing store in response to the at least one query. For example, queries can be generated for some or all of the set of requests to determine whether or not data identified for access in the some or all of the set of requests actually exists in memory. A query can be generated for and can be sent to a backing store, where the query includes an identifier for data requested for access in one of the set of requests. Execution of the one of the set of requests can be abandoned or otherwise foregone in response to the receiving a notification from the backing store in response to the query indicating the data does not exist in memory. When the notification indicates the data does exist in memory, the request can be scheduled for execution as described herein.

Queries to the backing store can also be utilized to determine the resource requirements for some or all of the requests. For example, a set of queries can be generated and can be sent to at least one backing store. The set of queries can indicate requests to estimate the cost of performing each of the set of requests. The backing store to which each query is sent can be selected based on determining which portion of memory and/or which storage unit will be responsible for executing the request. A set of notifications can be received from the at least one backing store in response to the set of queries, where the set of notifications indicate estimated costs of performing each of the set of requests. The resource requirements for each of the set of requests can be set equal to and/or can be otherwise determined based on the estimated costs of performing each of the set of requests indicated in the set of notifications. In some embodiments, generating the scheduling data can include determining to execute a high number of requests that have lower estimated costs, for example, simultaneously and/or before executing a small number of requests that have higher estimated costs, for example, also simultaneously.

The method can further include determining to combine multiple requests, for example, that are determined to utilize overlapping resources and/or that cab be serviced as part of a same request to the backing store. A single query to a backing store can include a request for estimated costs of multiple requests and/or a request for an indication of whether required data is actually stored in memory for multiple requests, for example, that will all be executed by the same storage unit or otherwise access the same portion of memory. Furthermore, multiple requests accessing the same data and/or utilizing the same set of resources can be combined into a single request, for example, as a transaction.

In various embodiments, a non-transitory computer readable storage medium includes at least one memory section that stores operational instructions that, when executed by a processing system, for example, of a dispersed storage network (DSN) that includes a processor and a memory or of a storage unit that includes a processor and memory, causes the processing system to receive a set of requests for execution from at least one request issuer. Resource requirements are determined for each of the set of requests, and current resource availability data is determined for resources indicated in the resource requirements. Scheduling data is generated for the set of requests based on the resource requirements and the current resource availability data, where generating the scheduling data includes identifying a first subset of the set of requests and a second subset of the set of requests. The first subset of the set of requests are added to a queue in response to the scheduling data indicating the first subset of the set of requests be queued for execution. Execution of the set of requests is facilitated in accordance with the scheduling data by facilitating immediate, simultaneous execution of the second subset of the set of requests and by facilitating serial execution of the first subset of the set of requests. The first subset of the set of requests are from the queue in response to facilitating execution of the first subset of the set of requests.

Figure 11:
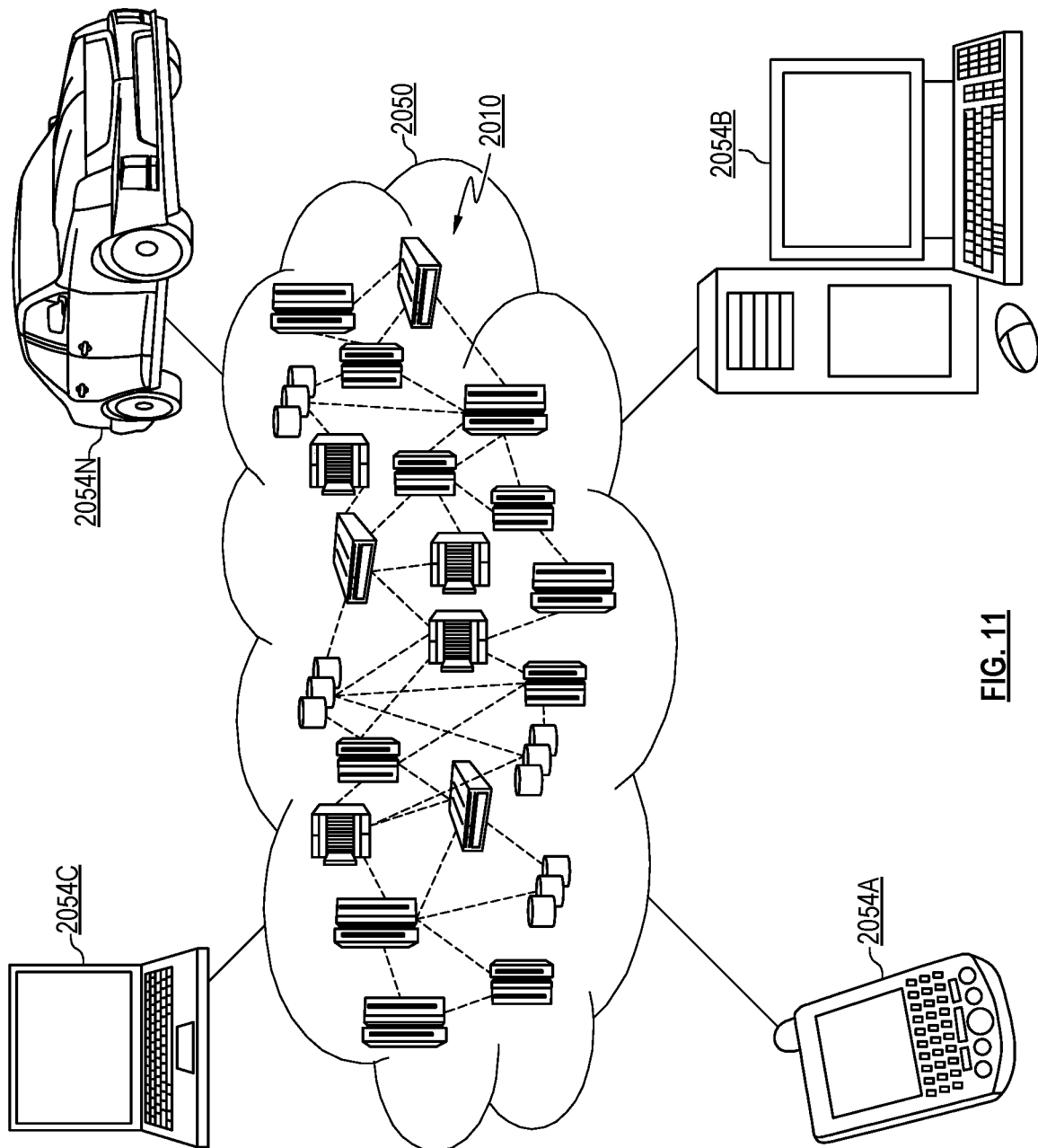
FIG. 11 depicts a cloud computing environment according to an embodiment of the present invention.

FIG. 11 presents an illustrative cloud computing environment 2050. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 11 are intended to be illustrative only and that computing nodes 2010 and cloud computing environment 2050 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In various embodiments, the DSN can be implemented by utilizing the cloud computing environment 2050 and/or can communicate with cloud computing environment 2050. Alternatively or in addition, the plurality of computing devices 12-16 of FIG. 1, the managing unit of FIG. 1, and/or the integrity processing unit 20 of FIG. 1, and/or storage units 36 can be implemented by utilizing cloud computing nodes 2010, personal digital assistant (PDA) or cellular telephone 2054A, desktop computer 2054B, laptop computer 2054C, and/or automobile computer system 2054N. In various embodiments, the cloud computing nodes 2010, personal digital assistant (PDA) or cellular telephone 2054A, desktop computer 2054B, laptop computer 2054C, and/or automobile computer system 2054N can communicate by utilizing network 24 of FIG. 1.

Figure 12:
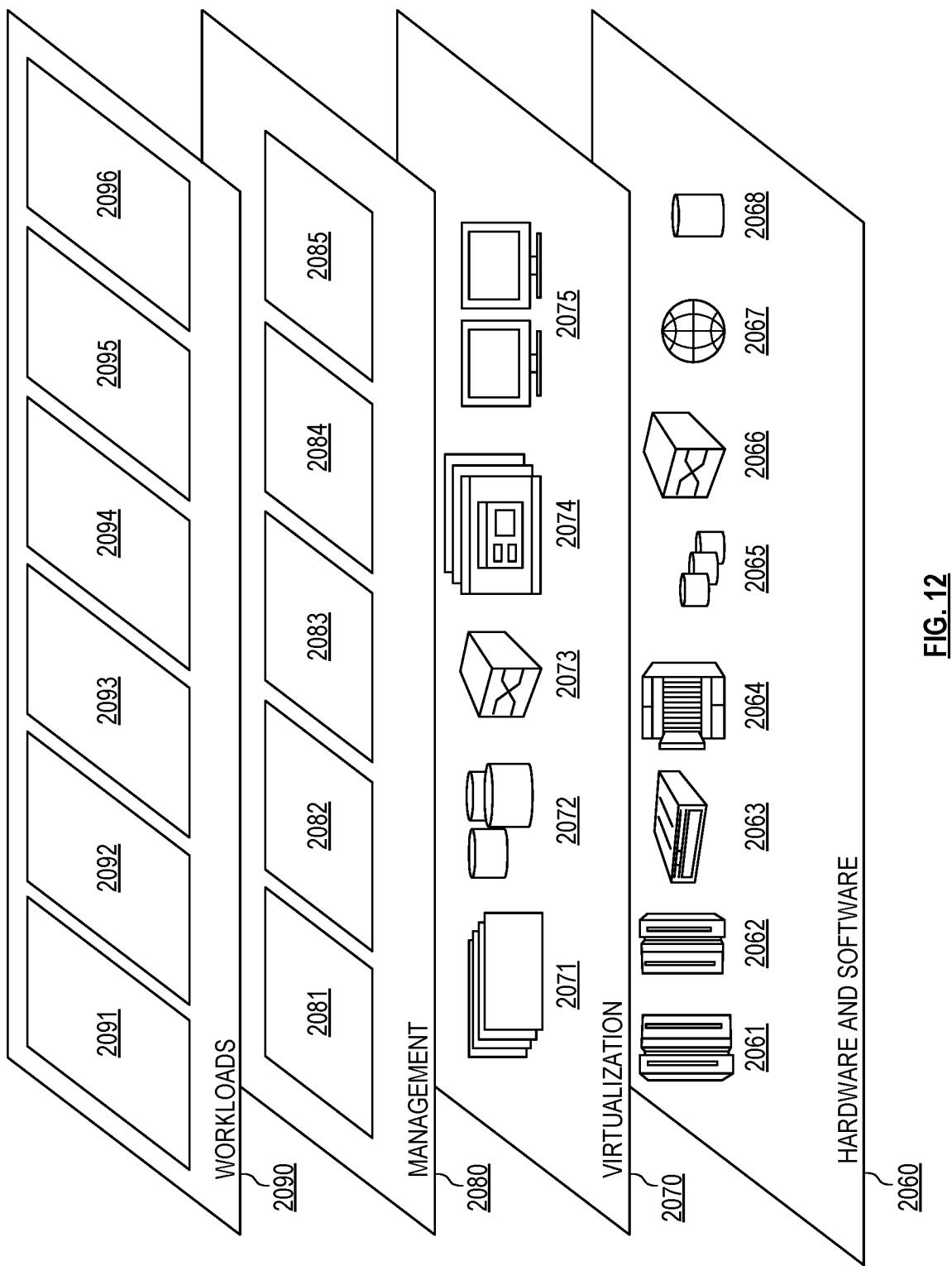
FIG. 12 depicts abstraction model layers according to an embodiment of the present invention.

Referring now to FIG. 12, a set of functional abstraction layers provided by cloud computing environment 2050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068. In some embodiments, one or more hardware components can be implemented by utilizing the computing device 2300 of FIG. 13.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and request scheduling system 2096. In some embodiments, the DSN 10 can utilize utilizing the cloud computing environment 2050, for example, by utilizing the request scheduling system 2096 of the workloads layer 2090 of FIG. 12 to perform request scheduling in the DSN as described in conjunction with FIGS. 1-10, where some or all computing devices 12-16 of FIG. 1 and/or the request scheduler 910 of FIG. 9A and/or FIG. 9B communicate with the network via a corresponding node 2010 of the cloud computing environment 2050.

FIG. 13 depicts a block diagram of components of a computing device 2300, which can be utilized to implement some or all of the cloud computing nodes 2010, some or all of the computing devices 54A-N of FIG. 11, and/or to implement other computing devices described herein in accordance with an embodiment of the present invention. The computing device 2300 can be utilized to implement some or all of the plurality of computing devices 12-16 of FIG. 1, the DS client module 34 of FIG. 1, the managing unit of FIG. 1, the integrity processing unit 20 of FIG. 1, and/or storage units 36 of FIG. 1. For example the computing core 26 of FIG. 2 can be implemented by utilizing the computing device 2300. It should be appreciated that FIG. 13 provides only an illustration of one implementation and does not imply any limitations with regard to the environments in which different embodiments may be implemented. Many modifications to the depicted environment may be made.

Computing device 2300 can include one or more processors 2302, one or more computer-readable RAMs 2304, one or more computer-readable ROMs 2306, one or more computer readable storage media 2308, device drivers 2312, read/write drive or interface 2314, and network adapter or interface 2316, all interconnected over a communications fabric 2318. Communications fabric 2318 can be implemented with any architecture designed for passing data and/or control information between processors (such as microprocessors, communications and network processors, etc.), system memory, peripheral devices, and any other hardware components within the system.

One or more operating systems 2310 and/or application programs 2311, such as network application server software 2067 and database software 2068, are stored on one or more of the computer readable storage media 2308 for execution by one or more of the processors 2302 via one or more of the respective RAMs 2304 (which typically include cache memory). In the illustrated embodiment, each of the computer readable storage media 2308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 2300 can also include a R/W drive or interface 2314 to read from and write to one or more portable computer readable storage media 2326. Application programs 2311 on computing devices 2300 can be stored on one or more of the portable computer readable storage media 2326, read via the respective R/W drive or interface 2314 and loaded into the respective computer readable storage media 2308.

Computing device 2300 can also include a network adapter or interface 2316, such as a TCP/IP adapter card or wireless communication adapter. Application programs 2311 on computing devices 2054A-N can be downloaded to the computing device from an external computer or external storage device via a network (for example, the Internet, a local area network or other wide area networks or wireless networks) and network adapter or interface 2316. From the network adapter or interface 2316, the programs may be loaded into the computer readable storage media 2308. The network may comprise copper wires, optical fibers, wireless transmission, routers, firewalls, switches, gateway computers and edge servers.

Computing device 2300 can also include a display screen 2320, a keyboard or keypad 2322, and a computer mouse or touchpad 2324. Device drivers 2312 interface to display screen 2320 for imaging, to keyboard or keypad 2322, to computer mouse or touchpad 2324, and/or to display screen 2320 for pressure sensing of alphanumeric character entry and user selections. The device drivers 2312, R/W drive or interface 2314, and network adapter or interface 2316 can comprise hardware and software stored in computer readable storage media 2308 and/or ROM 2306.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a request scheduler of a storage unit comprising multiple memory devices, the request scheduler including a processor, the method comprising:
   determining resource requirements for each request of a set of incoming requests to be executed at the storage unit, wherein the set of incoming requests are received from at least one request issuer;
   sending a query to a backing store of the storage unit requesting a location of data associated with each request of the set of incoming requests;
   receiving location data from the backing store in response to the query;
   determining current resource availability data for resources indicated in the resource requirements, the resource availability data including storage locations of currently stored data in one or more of the multiple memory devices;
   determining, based on the current resource availability data, a level of contention for shared resources between the set of incoming requests and: (a) one or more scheduled requests queued by the request scheduler and not yet executed, and (b) one or more tasks that are currently being executed by the storage unit;
   generating scheduling data for the set of requests based on the level of contention for shared resources, wherein generating the scheduling data includes identifying a first subset of the set of requests to be queued and a second subset of the set of requests to be immediately, simultaneously executed based on determining that a sum of portions of bandwidth resources, memory resources and processor resources required by the second subset of the set of requests does not exceed currently available bandwidth resources, memory resources, and processing resources;
   adding the first subset of the set of requests to a queue maintained by the request scheduler in response to the scheduling data indicating the first subset of the set of requests be queued for execution;
   facilitating execution of the set of requests within the storage unit in accordance with the scheduling data by facilitating immediate, simultaneous execution of the second subset of the set of requests and by facilitating serial execution of the first subset of the set of requests; and
   removing the first subset of the set of requests from the queue in response to facilitating execution of the first subset of the set of requests.

2. The method of claim 1, further comprising:
   generating queue size data by monitoring a length of the queue;
   generating a long queue notification that indicates the queue is currently long in response to determining the length of the queue indicated in the queue size data compares unfavorably to a queue maximum threshold; and
   sending the long queue notification to the at least one request issuer.

3. The method of claim 2, wherein the at least one request issuer determines to locally queue at least one future request in response to receiving the long queue notification.

4. The method of claim 1, further comprising:
   receiving the set of requests from a plurality of request issuers via a network, wherein the plurality of request issuers includes the at least one request issuer.

5. The method of claim 1, further comprising:
   generating contention data based on determining overlapping resource requirements amongst different ones of the set of requests:
   wherein the determining a level of contention is based on the contention data, and
   wherein the scheduling data indicates the first subset of the set of requests be included in the queue for serial execution in response to the contention data indicating that the first subset of the set of requests have overlapping resource requirements, and wherein the scheduling data indicates simultaneous execution of the second subset of the set of requests in response to the contention data indicating that the second subset of the set of requests do not have overlapping resource requirements.

6. The method of claim 1, wherein the second subset of the set of requests for immediate, simultaneous execution is identified based on determining total resource requirements of the second subset of the set of requests compare favorably to the current resource availability data.

7. The method of claim 1, wherein the set of requests include an access request for data stored in at least one of a plurality of memory devices managed by the request scheduler, further comprising:
sending a query for resource availability to the at least one of a plurality of memory devices; and
receiving the current resource availability data from the at least one of the plurality of memory devices in response to the query.

8. The method of claim 1, further comprising:
sending a set of queries to at least one backing store, wherein the set of queries are generated to indicate requests to estimate a cost of performing each of the set of requests; and
receiving a set of notifications from the at least one backing store in response to the set of queries, wherein the set of notifications indicate estimated costs of performing each of the set of requests;
wherein the resource requirements for each of the set of requests are determined based on the estimated costs of performing each of the set of requests indicated in the set of notifications.

9. The method of claim 1, further comprising:
retrieving historical data tracked by the request scheduler, wherein the historical data indicates actual resource requirements determined for a plurality of previously executed requests;
determining the resource requirements by generating prediction data, wherein the prediction data indicates expected resource requirements for the set of requests based on the historical data;
determining actual resource requirements for the set of requests in response to facilitating execution of the set of requests;
updating the historical data to include the actual resource requirements for the set of requests;
receiving another set of requests after completion of execution of the set of requests; and
generating second scheduling data to facilitate execution of the another set of requests by utilizing the updated historical data.

10. The method of claim 9, further comprising:
determining the current resource availability data by generating second prediction data, wherein the second prediction data indicates expected current resource availability data for the set of requests based on the historical data.

11. The method of claim 10, wherein generating the second prediction data includes determining expected resource requirements, based on the historical data, for a currently executed set of requests that are currently being executed, wherein the expected current resource availability data is determined based on subtracting a sum of the expected resource requirements for the currently executed set of requests from a total resource capacity.

12. The method of claim 9, further comprising identifying a subset of similar ones of the plurality of previously executed requests for each of the set of requests, wherein the expected resource requirements are determined for the each of the set of requests based on the actual resource requirements of the subset of similar ones of the plurality of previously executed requests.

13. The method of claim 12, wherein the actual resource requirements of the historical data indicate actual CPU usage requirements of the plurality of previously executed requests, and wherein the expected resource requirements indicate expected CPU usage requirements for the each of the set of requests based on the actual CPU usage requirements of the subset of similar ones of the plurality of previously executed requests.

14. The method of claim 12, wherein the actual resource requirements of the historical data indicate actual execution duration times of the plurality of previously executed requests, and wherein the expected resource requirements indicate expected execution duration times for the each of the set of requests based on the actual execution duration times of the subset of similar ones of the plurality of previously executed requests.

15. The method of claim 12, wherein the subset of similar ones of the plurality of previously executed requests are identified based on at least one of: a location of data indicated in the subset of similar ones of the plurality of previously executed requests comparing favorably to the location of data indicated in the each of the set of requests, a size of data indicated in the subset of similar ones of the plurality of previously executed requests comparing favorably to a size of data indicated in the each of the set of requests, or a type of access indicated in the subset of similar ones of the plurality of previously executed requests comparing favorably to a type of access indicated in the each of the set of requests.

16. The method of claim 1, wherein generating scheduling data includes:
determining a plurality of priority values corresponding to the set of requests;
identifying a highest priority one of the set of requests with a most favorable one of the plurality of priority values;
determining to execute the highest priority one of the set of requests first, before all other ones of the set of requests, in response to the highest priority one of the set of requests having the most favorable one of the plurality of priority values;
queueing the highest priority one of the set of requests in response to determining the current resource availability data compares unfavorably to the resource requirements of the highest priority one of the set of requests in response to at least one previous request currently being executed;
queueing the all other ones of the set of requests in response to determining to execute the highest priority one of the set of requests first, wherein the current resource availability data compares favorably to the resource requirements of at least one of the all other ones of the set of requests; and
determining updated current resource availability data, wherein the updated current resource availability data compares favorably to the resource requirements of the highest priority one of the set of requests in response to the at least one previous request completing execution;
wherein execution of the highest priority one of the set of requests is facilitated in response to the updated current resource availability data compares favorably to the resource requirements of the highest priority one of the set of requests; and
wherein execution of the all other ones of the set of requests is facilitated in response to determining execution of the highest priority one of the set of requests has completed, in accordance with the scheduling data.

17. The method of claim 1, further comprising:
determining to increase a total capacity of the queue in response to the current resource availability data indicating an increase in resource availability from a previous resource availability;
generating a queue length increase notification that indicates the increase in total capacity of the queue; and
sending the queue length increase notification to the at least one request issuer, wherein the at least one request issuer determines to send at least one locally queued request to the request scheduler in response to receiving the queue length increase notification.

18. The method of claim 1, further comprising:
sending another query the backing store, wherein the query includes an identifier for data requested for access in one of the set of requests; and
foregoing execution of the one of the set of requests in response to the receiving a notification from the backing store in response to the query indicating the data does not exist in memory.

19. A processing system of a request scheduler of a storage unit comprising multiple memory devices, the request scheduler comprising:
at least one processor; and
a memory that stores operational instructions, that when executed by the at least one processor cause the processing system to:
determine resource requirements for each request of a set of incoming requests to be executed at the storage unit, wherein the set of incoming requests are received from at least one request issuer;
send a query to a backing store of the storage unit requesting a location of data associated with each request of the set of incoming requests;
receive location data from the backing store in response to the query;
determine current resource availability data for resources indicated in the resource requirements, the resource availability data including storage locations of currently stored data in one or more of the multiple memory devices;
determine, based on the current resource availability data, a level of contention for shared resources between the set of incoming requests and: (a) one or more scheduled requests queued by the request scheduler and not yet executed, and (b) one or more tasks that are currently being executed by the storage unit;
generate scheduling data for the set of requests based on the level of contention for shared resources, wherein generating the scheduling data includes identifying a first subset of the set of requests to be queued and a second subset of the set of requests to be immediately, simultaneously executed based on determining that a sum of portions of bandwidth resources, memory resources and processor resources required by the second subset of the set of requests does not exceed currently available bandwidth resources, memory resources, and processing resources;
add the first subset of the set of requests to a queue maintained by the request scheduler in response to the scheduling data indicating the first subset of the set of requests be queued for execution;
facilitate execution of the set of requests within the storage unit in accordance with the scheduling data by facilitating immediate, simultaneous execution of the second subset of the set of requests and by facilitating serial execution of the first subset of the set of requests; and
remove the first subset of the set of requests from the queue in response to facilitating execution of the first subset of the set of requests.

20. A computer readable storage medium comprises:
at least one memory section that stores operational instructions that, when executed by a processing system of a request scheduler that includes a processor and a memory, causes the processing system of the request scheduler to:
determine resource requirements for each request of a set of incoming requests to be executed at a local storage unit comprising multiple memory devices, wherein the set of incoming requests are received from at least one request issuer;
send a query to a backing store of the storage unit requesting a location of data associated with each request of the set of incoming requests;
receive location data from the backing store in response to the query;
determine current resource availability data for resources indicated in the resource requirements, the resource availability data including storage locations of currently stored data in one or more of the multiple memory devices;
determine, based on the current resource availability data, a level of contention for shared resources between the set of incoming requests and: (a) one or more scheduled requests queued by the request scheduler and not yet executed, and (b) one or more tasks that are currently being executed by the local storage unit;
generate scheduling data for the set of requests based on the level of contention for shared resources, wherein generating the scheduling data includes identifying a first subset of the set of requests to be queued and a second subset of the set of requests to be immediately, simultaneously executed based on determining that a sum of portions of bandwidth resources, memory resources and processor resources required by the second subset of the set of requests does not exceed currently available bandwidth resources, memory resources, and processing resources;
add the first subset of the set of requests to a queue maintained by the request scheduler in response to the scheduling data indicating the first subset of the set of requests be queued for execution;
facilitate execution of the set of requests within the local storage unit in accordance with the scheduling data by facilitating immediate, simultaneous execution of the second subset of the set of requests and by facilitating serial execution of the first subset of the set of requests; and
remove the first subset of the set of requests from the queue in response to facilitating execution of the first subset of the set of requests.

* * * * *